United States Patent [19]

Kuno et al.

[11] 4,002,062
[45] Jan. 11, 1977

[54] AVERAGE FUEL CONSUMPTION RATE MEASURING SYSTEM

[75] Inventors: Akira Kuno, Nagoya; Yoshio Shinoda, Okazaki; Hiroshi Arai, Toyota, all of Japan

[73] Assignees: Nippon Soken, Inc., Nishio; Toyota Jidosha Kogyo Kabushiki Kaisha, Toyota, both of Japan

[22] Filed: Sept. 25, 1975

[21] Appl. No.: 616,819

[30] Foreign Application Priority Data

Oct. 5, 1974 Japan .......................... 49-114853

[52] U.S. Cl. ........................... 73/114; 235/92 MT
[51] Int. Cl.² .......................................... G01F 9/00
[58] Field of Search .... 73/114; 235/92 MT, 150.21

[56] References Cited

UNITED STATES PATENTS

| | | | |
|---|---|---|---|
| 3,549,868 | 12/1970 | Watson | 73/114 X |
| 3,908,451 | 9/1975 | Walker et al. | 73/114 |
| 3,927,305 | 12/1975 | Gruhl | 73/114 |

*Primary Examiner*—Jerry W. Myracle
*Attorney, Agent, or Firm*—Cushman, Darby & Cushman

[57] ABSTRACT

An average fuel consumption rate measuring system wherein the distance traveled by a vehicle per unit fuel consumption is computed and indicated to let the driver know the driving conditions of the vehicle and instruct the driver in economical driving. Namely, a first electrical signal is generated for every predetermined distance traveled by the vehicle and the signals are integrated to indicate the total distance traveled, while on the other hand a second electrical signal is generated for every predetermined amount of fuel consumed by the vehicle and the signals are integrated to indicate the total fuel consumption, and one of the integrated value is divided by the other to indicate an average fuel consumption rate.

5 Claims, 2 Drawing Figures

AVERAGE FUEL CONSUMPTION RATE MEASURING SYSTEM

BACKGROUND OF THE INVENTION

1. Field of the Invention

The present invention relates to an average fuel consumption rate measuring system which is installed in a running vehicle such as an automobile, whereby the distances traveled as well as the amounts of fuel consumed from the beginning of the travel up to the present are integrated and the distance traveled per unit fuel quantity is computed and indicated to let the driver know the driving conditions and instruct the driver in economical driving.

2. Description of the Prior Art

In devices of the above type which have heretofore been proposed, as for example disclosed in the Japanese Laid Open Patent Application Tokukai-Sho 48-5453, fuel consumption is measured and indicated at intervals of predetermined time and the measured value is then indicated in units of l/sec. Therefore, a disadvantage of these conventional devices is that the measured value has no bearing on the distance traveled and hence the measured value must be converted to indicate it in units of Km/l which is the generally used unit for indicating fuel consumption rates.

With a view to overcoming the foregoing difficulty, it is an object of the present invention to provide an average fuel consumption rate measuring system wherein the distance traveled by a vehicle and the fuel consumption are counted and stored, whereby the average fuel consumption rate is computed and indicated at intervals of predetermined distance or fuel consumption to indicate the fuel consumption rate in the ordinary units of Km/l and give instruction to the driver in economical driving.

It is another object of the present invention to provide an average fuel consumption rate measuring system wherein the computation of average fuel consumption rate may be reset to set as desired the time of the beginning of average fuel consumption rate computing operation.

It is still another object of the present invention to provide an average fuel consumption rate measuring system wherein the computation of average fuel consumption rate is inhibited until a preset distance has been traveled or a preset quantity of fuel has been consumed, thereby eliminating any erroneous computation of average fuel consumption rate and thus preventing the driver from making any erroneous judgement.

It is still another object of the present invention to provide an average fuel consumption rate measuring system wherein the fact that computation and indication of average fuel consumption rate are not being made is indicated to enable the driver to confirm the existence of any malfunction or irregularity in the operation of the system.

DESCRIPTION OF THE PREFERRED EMBODIMENT

The present invention will now be described in greater detail with reference to the illustrated embodiment.

Figure 1:
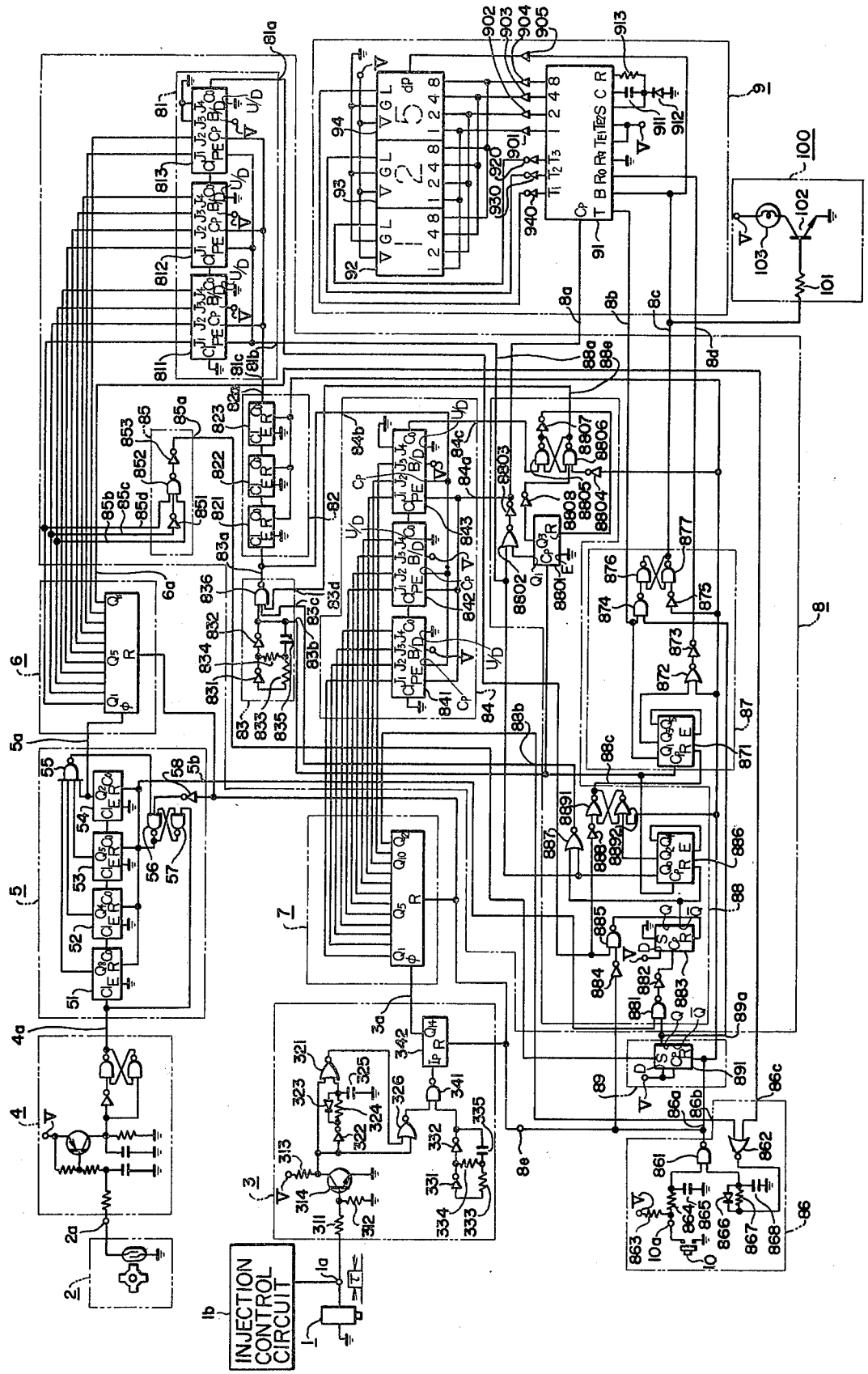
FIG. 1 is a wiring diagram showing an embodiment of an average fuel consumption rate measuring system according to the invention.

Referring to FIG. 1, numeral 1 designates a fuel injection valve which opens in response to an injection signal applied to a terminal 1a to control the quantity of fuel fed to an internal combustion engine which is not shown, and the injection signal is controlled by an injection control circuit 1b to adjust its time width $t$ to suit the fuel requirements of the engine. Numeral 2 designates a speed sensor for detecting the number of revolutions of the vehicle wheel which comprises a magnet securely attached to a speedometer cable and a reed switch arranged adjacent to the magnet, whereby a revolution signal consisting of four pulses is generated at a terminal 2a for every revolution of the speedometer cable. Numeral 3 designates a fuel measuring circuit for measuring the injection duration of the injection signal and generating at an output terminal 3a a pulse signal corresponding to the required quantity of fuel injected from the fuel injection valve 1. The fuel measuring circuit 3 comprises a buffer circuit including resistors 311, 312 and 313 and an input buffering transistor 314, a delay circuit for subtracting the delay time in the response of the fuel injection valve 1 to the injection signal which includes NOR gates 321 and 326, a NOT gate 322, a resistor 324, a diode 323 and a capacitor 325, an oscillator circuit including NOT gates 331 and 332, resistors 333 and 334 and a capacitor 335 for generating clock signals having a predetermined frequency and a conversion circuit including a NAND gate 341 and a binary counter 342 (the RCA IC CD4020A). In the illustrated embodiment, the oscillation frequency of the oscillator circuit and the terminal of the binary counter 342 are selected so that a 1 level pulse is generated at the output terminal 3a for every fuel consumption of 10 cc. Numeral 4 designates a reshaping circuit for reshaping the waveform of the revolution signal, 5 a distance measuring circuit for dividing the frequency of the revolution signal generated at the terminal 4a of the reshaping circuit 4 and generating a pulse at terminals 5a and 5b each time a predetermined distance is traveled. The distance measuring circuit 5 includes decade counters 51, 52, 53 and 54 (the RCA IC CD4017A), a NAND gate 55, a flip-flop consisting of NAND gates 56 and 57 and a NOT gate 58, and since the speedometer cable of the speed sensor 2 used in this embodiment makes 637 revolutions for every 1 kilometer traveled, a ½, 548 frequency division results in the generation of a 1 level pulse at the terminals 5a and 5b for every 1 kilometer traveled. Numeral 6 designates a distance integrating circuit comprising a binary counter (the RCA IC CD4040A) for integrating the pulses which are generated at the terminal 5a, 7 a fuel integrating circuit comprising a binary counter (the RCA IC CD4040A) for integrating the pulses which are generated at the terminal 3a. Numeral 86 designates a reset signal generating circuit comprising a normally open switch 10, a NAND gate 861, a NOR gate 862, resistors 863, 864 and 867, capacitors 865 and 868 and a diode 868, and the normally open switch 10 is mounted for example on the instrument panel of the vehicle so that the time of the beginning of average fuel consumption rate computing operation may be set as desired by the driver by closing the switch 10 when starting the vehicle or while the vehicle is in motion. When the switch 10 is closed, a terminal 10a goes to a 0 level and the NAND gate 861 generates a 1 level reset signal thus causing terminals 86a and 86b also to go to the 1 level. This reset signal clears the contents of the binary counter 342 in the fuel measuring circuit 3, the fuel integrating circuit 7, the distance measuring circuit 5 and the distance integrating circuit 6 which have been attained before the closing of the switch 10. On the other hand, since the fuel measuring circuit 3 generates a 1 level pulse at the terminal 3a for every fuel consumption of 10 cc and the distance measuring circuit 5 generates a 1 level pulse at the terminal 5a for every 1 kilometer traveled, when the outputs of the fuel integrating circuit 7 and the distance integrating circuit 6 for integrating the respective input pulses respectively reach a predetermined value just prior to the saturation, terminals 86b and 86c go to the 1 level and the NAND gate 861 generates a 1 level reset signal at the terminal 86a. Also in this embodiment, the NOR gate 862 generates a 0 level when the distance traveled reaches 1,024 kilometers or the fuel consumption reaches 20,480 cc thus resulting in the generation of a 1 level reset signal at the terminal 86a. In other words, when any one of three conditions is met, namely, when the switch 10 is closed, when the fuel consumption exceeds a predetermined value or when the distance traveled exceeds a predetermined value, a 1 level reset signal is generated at the terminal 86a thus causing the respective circuits to start the computational operation anew. Numeral 85 designates a minimum distance setting circuit comprising NOT gates 851 and 853 and a NAND gate 852 for setting a distance during which the operation of computing and indicating average fuel consumption rate that will be described later is inhibited even after the generation of the reset signal. Since, in this embodiment, the minimum distance setting circuit 85 receives $Q_1$, $Q_2$ and $Q_3$ outputs of the distance integrating circuit 6, its output terminal 85a goes to the 1 level when the distance traveled after the generation of the reset signal reaches 5 kilometers, whereas the output terminal 85a is at the 0 level when the distance traveled is greater than 6 kilometers or less than 5 kilometers. Numeral 89 designates a computation inhibit circuit consisting of an R-S flip-flop 891 (the RCA IC CD4013) which is reset by the reset signal generated at the terminal 86a to generate a 0 level at its output terminal 89a and inhibit the computation and indication of average fuel consumption rate, whereas it is set in response to the generation of a 1 level at the terminal 85a of the minimum distance setting circuit 85 so that a 1 level is generated at its terminal 89a and the computation and indication of average fuel consumption rate are restarted. The terminal 89a remains at the 1 level until the next reset signal is generated. Numeral 83 designates an oscillator circuit comprising NOT gates 831 and 832, resistors 833 and 834, a capacitor 835 and a NAND gate 836, wherein clock signals having a predetermined frequency $f_0$ are generated at its output terminal 83b whereas the clock signals having the predetermined frequency $f_0$ are generated at its output terminal 83a when both of its terminals 83c and 83d are at the 1 level. Numeral 83 designates a frequency divider comprising cascade connected decade counters 821, 822 and 823 (the RCA IC CD4017), wherein the clock signals generated at the terminal 83a are subjected to a 1/1000 frequency division and the resulting clock signals having a frequency $f_0/1000$ are generated at its output terminal 82a. Numeral 81 designates a divided setting circuit comprising cascade connected reversible counters 811, 812 and 813 (the RCA IC CD4029), wherein the counting control terminals (U/D) of the reversible counters 811, 812 and 813 are grounded to enable the counters to serve as backward counters. The dividend setting circuit 81 stores the integrated value of the distance integrating circuit 6 when its terminal 81b goes to the 1 level, whereas when its terminal 81a goes to the 1 level the dividend setting circuit 81 counts in the reverse direction each time a clock signal is applied to its terminal 81c. When the stored contents of the dividend setting circuit 81 become zero, the terminal 81a goes to the 0 level. Numeral 84 designates a divisor setting circuit comprising reversible counters 841, 842 and 843 in the similar manner as the dividend setting circuit 81, wherein the integrated value of the fuel integrating circuit 7 is stored when its terminal 84a goes to the 1 level, whereas it counts in the reverse direction in response to each clock signal applied to its terminal 84b from the oscillator circuit 83 and its terminal 84c goes to the 0 level when the stored contents become zero.

Figure 2:
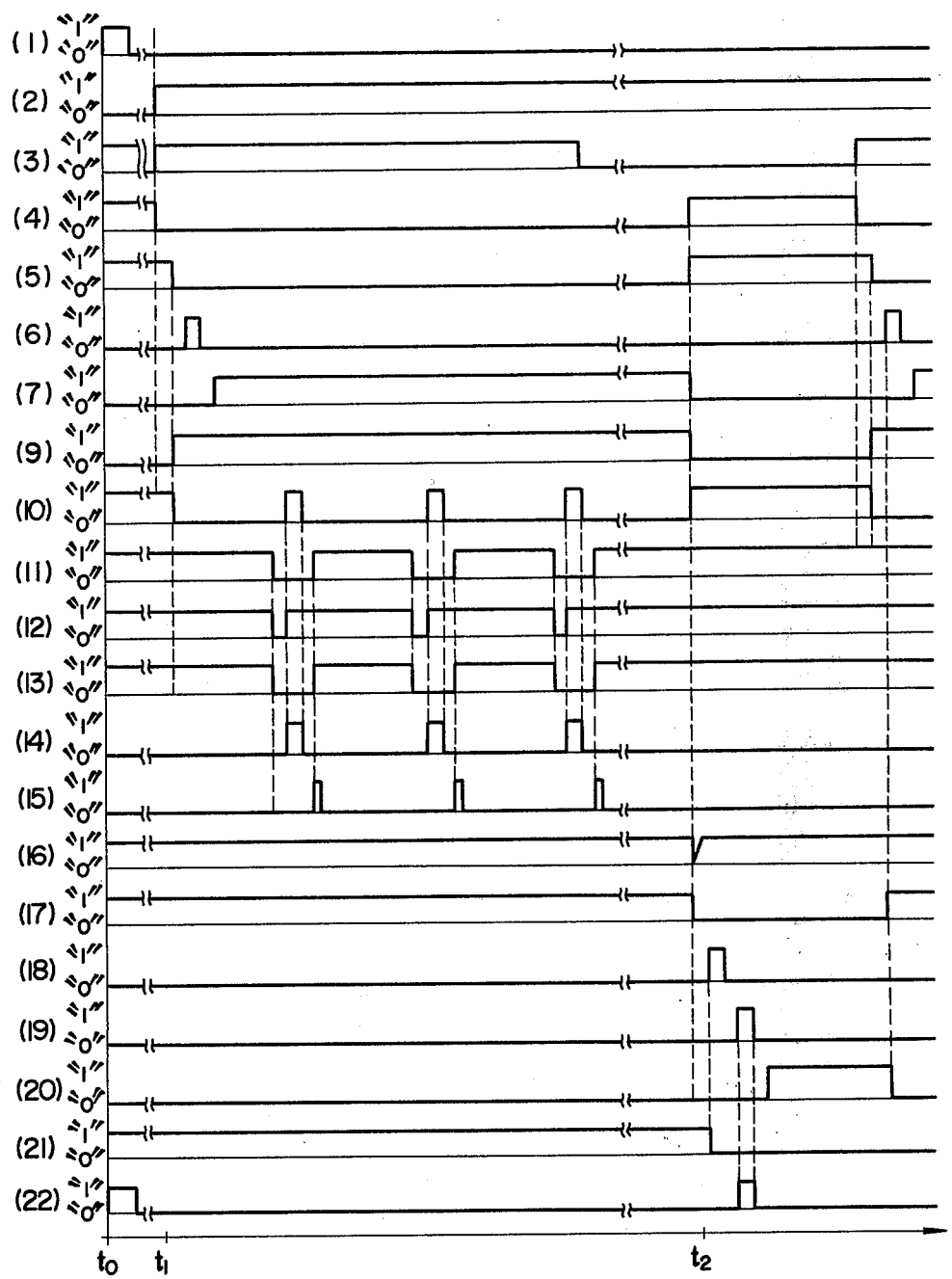
FIG. 2 is a diagram showing the signal waveforms generated at various points in the circuit of FIG. 1 which are useful for explaining the operation of the system of this invention.

Numeral 88 designates a control circuit for controlling the average fuel consumption rate computing operation comprising NAND gates 881 and 885, inverters 882, 884, 888, 8803, 8804, 8807 and 8808, D-type flip-flop 883, NOR gates 887 and 8802, decade counters 886 and 8801 (the RCA IC CD4017), a flip-flop including NAND gates 8805 and 8806 and a flip-flop including NOR gates 8891 and 8892. The operation of this control circuit 88 will be described in reference to the signal wavefrom diagram shown in FIG. 2. When the reset signal generating circuit 86 generates a 1 level reset signal at a time $t_0$ as shown in FIG. 2(1), the terminal 89a of the computation inhibit circuit 89 goes to the 0 level as shown in FIG. 2(2). This reset signal causes the output of the NOT gate 884 to go to the 0 level and the output of the NAND gate 885 to go to the 1 level, so that the $\overline{Q}$ output of the D-type flip-flop 883 goes to the 1 level as shown in FIG. 2(4) and the decade counter 886 is reset causing its $Q_0$, $Q_2$ and $Q_4$ outputs to go respectively to the 1 level, 0 level and 0 level as shown in (5), (6) and (7) of FIG. 2, respectively. Consequently, the output of the NOR gate 887 and the terminal 88b go to the 0 level as shown in FIG. 2(9) so that the output of the NOR gate 8802 goes to the 0 level and the output of the NOT gate 8803 and the terminals 8a and 84a go to the 1 level as shown in FIG. 2(10). The reset signal is also inverted by the NOT gate 8804 with the result that the output of the NAND gate 8806 in the flip-flop including the NAND gates 8805 and 8806 and the terminal 88e are at the 1 level as shown in FIG. 2(11). Since, as mentioned earlier, the terminal 84c is at the 1 level as shown in FIG. 2(12) at the time of the generation of the reset signal, the output of the NAND gate 8805 is at the 0 level and the output of the NOT gate 8807 is at the 1 level as shown in FIG. 2(13) with the result that the decade counter 8801 is in the reset state and consequently its $Q_1$ and $Q_3$ outputs are at the 0 level as shown in (14) and (15) of FIG. 2, respectively. Further, similarly as the terminal 84c, the terminal 81a is at the 1 level as shown in FIG. 2(16) at the time of the generation of the reset signal, with the result that the output of the NOT gate 888 goes to the 0 level and the output of the NOR gate 8891 in the flip-flop including the NOR gates 8891 and 8892 and the terminal 88c are at the 1 level as shown in FIG. 2(17). When the distance traveled reaches 5 kilometers at a time $t_1$, the terminal 85a of the minimum distance setting circuit 85 goes to the 1 level and the D-type flip-flop 891 is set thus causing the terminal 89a to go to the 1 level as shown in FIG. 2(2). Since the distance measuring circuit 5 is designed so that its terminal 5b goes to the 1 level each time 1 kilometer is traveled after the generation of the reset signal, it also goes to the 1 level at the time $t_1$. Consequently, though the output of the NAND gate 881 goes to the 0 level, it is inverted by the NOT gate 882 and the $\overline{Q}$ output of the D-type flip-flop 883 goes to the 0 level as shown in FIG. 2(4). As a result, the reset state of the decade counter 886 is released and its $Q_0$, $Q_2$ and $Q_4$ outputs sequentially go to the 1 level as shown in (5), (6) and (7) of FIG. 2, respectively, but the $Q_4$ output is kept at the 1 level. During the time that the $Q_0$ output of the D-type flip-flop 886 is held at the 1 level, the terminals 88a and 81b are at the 1 level causing the dividend setting circuit 81 to store the integrated value of the distance integrating circuit 6 as mentioned earlier and at the same time the terminal 84a goes to the 1 level causing the divisor setting circuit 84 to store the integrated value of the fuel integrating circuit 7. Thereafter, when the $Q_0$ output of the decade counter 886 goes to the 0 level as shown in FIG. 2(5), the output of the NOR gate 887 and the terminals 88b and 83c go to the 1 level as shown in FIG. 2(9) since the $\overline{Q}$ output of the D-type flip-flop 883 has also gone to the 0 level as shown in FIG. 2(4). On the other hand, since the terminal 88e remains at the 1 level after the generation of the reset signal, the clock signals having the frequency $f_0$ are applied to the terminal 83a and the clock signals having the frequency $f_0/1000$ are applied to the terminal 82a. Consequently, in response to each of the clock signals applied to the terminals 81c and 84b, the dividend setting circuit 81 and the divisor setting circuit 84 respectively count in the reverse direction to decrease their respective stored contents as mentioned earlier. However, since the down counting rate of the dividend setting circuit 81 is lower than that of the divisor setting circuit 84, the stored contents of the divisor setting circuit 84 are reduced to zero earlier than the dividend setting circuit 81. When the divisor setting circuit 84 complete one cycle of its down counting, the terminal 84c goes to the 0 level as shown in FIG. 2(12) and the output of the flip-flop comprising the NAND gates 8805 and 8806 is changed thus causing the terminal 88e and the output of the NOT gate 8807 respectively to go to the 0 level. When this occurs, the reset state of the decade counter 8801 is released so that it starts counting the clock signals having the frequency $f_0$ and applied from the oscillator circuit 83 and thus its $Q_1$ and $Q_3$ outputs sequentially go to the 1 level as shown in (14) and (15) of FIG. 2. Further, at the instant that the terminals 88e and 83d go to the 0 level, the clock signals having the frequencies $f_0$ and $f_0/1000$ and applied to the terminals 83a and 82a are stopped by the NAND gate 836 and the down counting operation of the dividend setting circuit 81 is also stopped. Thereafter, when the $Q_1$ output of the decade counter 8801 goes to the 1 level as shown in FIG. 2(14), the terminal 84a goes to the 1 level as shown in FIG. 2(10) and the divisor setting circuit 84 again stores the integrated value of the fuel integrating circuit 7 this causing the terminal 84c to go to the 1 level again as shown in FIG. 2(12). Thereafter, as the $Q_3$ output of the decade counter 8801 goes to the 1 level as shown in FIG. 2(15), the terminal 88e and the output of the NOT gate 8807 change from the 0 to 1 level as shown in (11) and (13) of FIG. 2 and the decade counter 8801 is reset thus causing the $Q_3$ output to return to the 0 level as shown in FIG. 2(15). At the same time that the terminals 88e and 83d go to the 1 level the clock signals having the frequency $f_0$ and the clock signals having the frequency $f_0/1000$ are respectively applied to the terminals 83a and 82a so that the divisor setting circuit 84 counts down in the same manner as mentioned previously in response to every clock signal applied and the dividend setting circuit 81 restarts the down counting from its stored contents existed when the previous down counting operation was stopped.

When the above-mentioned process is carried out repeatedly so that the terminal 81a of the dividend setting circuit 81 goes to the 0 level at a time $t_2$ as shown in FIG. 2(16), the output of the NAND gate 885 goes to the 1 level and the D-type flip-flop 883 is reset causing its $\overline{Q}$ output to go to the 1 level as shown in FIG. 2(4). Consequently, the decade counter 886 is reset and thus its $Q_0$, $Q_2$ and $Q_4$ outputs respectively go to the 1 level, the 0 level and the 0 level as shown in (5), (6) and (7) of FIG. 2, respectively. When this occurs, the output of the NOR gate 887 and the terminal 88b go to the 0 level, so that the generation of the clock signals at the terminals 83a and 82a is stopped by the NAND gate 836 and the terminals 84a and 88a go to the 1 level as shown in (10) and (5) of FIG. 2. Simultaneously, the output of the flip-flop comprising the NOR gates 8891 and 8892 is changed and the terminal 88c goes to the 0 level as shown in FIG. 2(17).

When the computation of average fuel consumption rate is completed in the manner described above, a number of pulses corresponding to the quotient of the division of the distance traveled by the fuel consumption are generated at the terminals 84a and 8a.

Numeral 87 designates an indication signal generating circuit comprising a decade counter 871 (the RCA IC CD4017), a NOR gate 872, NOT gates 873 and 875, a NAND gate 874 and a flip-flop including NAND gates 876 and 877, 9 a first indication circuit comprising a counting circuit 91 (the Tokyo Shibaura Denki TC5001c), display units 92, 93 and 94 (the Yokokawa Hewlett Packard LED Indicator 5082-7302), the attendant buffer gates 901, 902, 903, 904 and 905, NOT gates 920, 930 and 940, a resistor 913, a capacitor 911 and a diode 912.

Consequently, when the terminal 88c goes to the 0 level at the time $t_2$ as mentioned previously, the reset state of the decade counter 871 is released and its $Q_1$, $Q_3$ and $Q_5$ outputs sequentially go to the 1 level as shown in (18), (19) and (20) of FIG. 3. Consequently, when the $Q_1$ output of the decade counter 871 and the terminal 8b go to the 1 level as shown in FIG. 2(18), the counting circuit 91 of the first indicating circuit 9 stores the number of the pulses generated as shown in FIG. 2(11) at the terminal 8a during the time interval between the times $t_1$ and $t_2$. At the same time, the output of the NAND gate 874 goes to the 0 level with the result that the output of the flip-flop including the NAND gates 876 and 877 is changed and a terminal 8c goes to the 0 level as shown in FIG. 2(21). Consequently, the counting circuit 91 generates the number of the counted pulses at its outputs 1, 2, 4 and 8 and simultaneously the decimal point placed just to the left of the figure of the display unit 94 is displayed. Thereafter, as the $Q_3$ output of the decade counter 871 goes to the 1 level as shown in FIG. 2(19), a terminal 8d goes to the 1 level as shown in FIG. 2(22) and the pulse count in the counting circuit 91 is reset but the display operation of the display units 92, 93 and 94 is continued. In this way, one cycle of the operation of division and indication is completed and each time the vehicle travels another 1 kilometer these circuits repeat the above-mentioned operations to indicate an average fuel consumption rate after the generation of the reset signal.

Numeral 100 designates a second indication circuit for indicating the non-operated condition of the first indication circuit 9, comprising a resistor 101 connected to the terminal 8c, a transistor 102 and an indicator 103. When no average fuel consumption rate is displayed by the first indication circuit 9, the terminal 8c is held at the 1 level and the transistor 102 is tuned on thus lighting the indicator lamp 103, whereas when an average fuel consumption rate is being displayed by the first indication circuit 9, the terminal 8c is held at the 0 level and the indicator lamp 103 is extinguished.

Consequently, when the vehicle is in motion, either one of the first and second indication circuits gives an indication, whereas when there is no indication it enables the driver to know that the average fuel consumption rate measuring system of this invention is malfunctioning.

In the embodiment described above, the oscillator circuit 83, the frequency divider 82, the dividend setting circuit 81, the divisor setting circuit 84, the control circuit 88 and the indication signal generating circuit 87 constitute a divider circuit 8 which performs the operation of division of traveled distance by fuel consumption for every one kilometer traveled by the vehicle and the number of pulses corresponding to the resulting quotient are generated at the terminal 8a. A numerical example of the computation and indication of average fuel consumption rates in the divider circuit 8 and the first indication circuit 9 will now be described for a case where the distance traveled by a vehicle is 50 kilometers and the fuel consumption is 4 liters.

In this condition, the integrated value of the distance integrating circuit 6 is 50 and therefore the time required for the dividend setting circuit 81 to complete the backward counting of this integrated value with clock signals of a frequency $f_0/1000$ is $50 \times 1000/f_0$ sec. On the other hand, the integrated value of the fuel integrating circuit 7 is 400 and therefore the time required for the divisor setting circuit 81 to complete the backward counting of this integrated value with clock signals of a frequency $f_0$ is $400/f_0$ sec. In this case, since the backward counting operation of the divisor setting circuit 84 is carried out repeatedly until the completion of one cycle of the backward counting operation of the dividend setting circuit 81 as mentioned earlier, the divisor setting circuit 84 repeats its backward counting operation 125 times and thus 125 pulses are generated at the terminal 8a. Since the first indication circuit 9 for counting these pulses has the circuit construction shown in FIG. 1, it is evident that the resulting indicated fuel consumption rate is 12.5 and moreover the fact that it is indicated in the generally used units of Km/l enables the driver to know how the vehicle was driven to travel 50 kilometers and use it as a guide on economical driving. While only a very short period of time is required for completing one cycle of the backward counting operation in the dividend setting circuit 81 and the stored contents of the divisor setting circuit 84 very rarely change during the backward counting operation, even if the stored contents change, the resulting error in the indicated average fuel consumption rate is such that the error may be neglected and no difficulty will be caused in the actual operation.

With the embodiment described above, the computation and indication of average fuel consumption rate may be effected each time a predetermined quantity of fuel is consumed. For instance, to compute and indicate an average fuel consumption rate each time the fuel consumption amounts to 10 cc, it is only necessary to modify the arrangement of FIG. 1 so that one input of the NAND gate 881 is connected to the terminal 3a instead of the terminal 5b. Further, to inhibit the computation and indication of average fuel consumption rate until a predetermined quantity of fuel is consumed, it is only necessary to add to the arrangement of FIG. 1 a minimum fuel setting circuit of the same construction as the minimum distance setting circuit 85. Assuming that the minimum distance setting circuit 85 is a minimum fuel setting circuit, then the terminals 85b, 85c and 85d may be connected respectively to the $Q_3$, $Q_2$ and $Q_1$ outputs of the fuel integrating circuit 7 so that the computational operation of the divider circuit 8 is inhibited by the computation inhibit circuit 89 until the fuel consumption reaches 50 cc after the generation of a reset signal thus preventing the computation and indication of an average fuel consumption rate which tends to give rise to a considerable error.

While the present invention has been described with reference to a specific embodiment, the reset signal generating circuit 86 may be connected for example to the key switch of the vehicle which is not shown as to effect the computation of an average fuel consumption rate at the beginning of every traveling. Still further, while the fuel consumption is measured in accordance with the duration of opening of the fuel injection valve 1 in the electronically controlled fuel injection system, the fuel consumption may be directly measured by means of, for example, a flow meter or alternately the fuel consumption may be computed and measured in accordance with the number of revolutions of an engine and the intake manifold vacuum and it is only necessary that the distance traveled is measured in such a manner that the number of pulses generated corresponds to the distance traveled. Furthermore, the division of traveled distance by fuel consumption is of course not limited to the computational arrangement used in the illustrated embodiment and it is also a matter of course that the frequency of computational operation is not limited to every 1 kilometer or every 50 cc.

We claim:
1. An average fuel consumption rate measuring system comprising:
a distance measuring circuit for generating a first electric signal each time a predetermined distance is traveled by a running vehicle;
a distance integrating circuit connected to said distance measuring circuit for counting said first electric signals to form an integrated value indicative of the cumulative distance traveled by said vehicle;
a fuel measuring circuit for generating a second electric signal each time a predetermined quantity of fuel is consumed by said vehicle;
a fuel integrating circuit connected to said fuel measuring circuit for counting said second electric signals to form an integrated value indicative of the cumulative amount of fuel consumed by said vehicle;

a divider circuit connected to said distance integrating circuit and said fuel integrating circuit for repetitively obtaining an average fuel consumption rate by dividing the integrated cumulative value of one of said integrating circuits by that of the other of said integrating circuits each time a selected one of the integrated cumulative values increases by a predetermined value; and an indication circuit connected to said divider circuit to indicate the result of said division by said divider circuit.

2. A system according to claim 1 further comprising a reset signal generating circuit for resetting respective ones of said circuits to set the time of beginning of the next average fuel consumption rate.

3. A system according to claim 1 further comprising a computation inhibit circuit for inhibiting the computational operation of said divider circuit until a selected one of the integrated cumulative values exceeds a predetermined value.

4. A system according to claim 3 further comprising another indication circuit for indicating that the operation of said divider circuit is being inhibited by said computation inhibit circuit.

5. A system according to claim 1, wherein said divider circuit includes a dividend setting circuit for counting down one of the integrated cumulative values with a first clock of a first fixed frequency and a divisor setting circuit for counting down the other of the integrated cumulative values with a second clock of a second fixed frequency higher than the first fixed frequency, and wherein the indication of said indication circuit is responsive to the count-down repetition number of said divisor setting circuit during one count-down repetition of said dividend setting circuit.

* * * * *